Nov. 7, 1961 M. LEVECQUE ET AL 3,007,196
MANUFACTURE OF FIBERS OF THERMOPLASTIC MATERIALS SUCH AS GLASS
Filed May 7, 1958 3 Sheets-Sheet 1
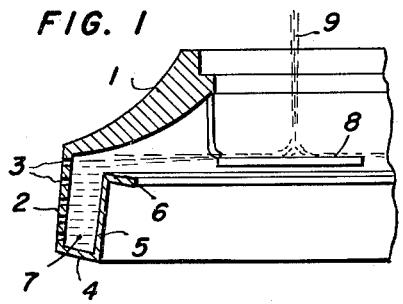
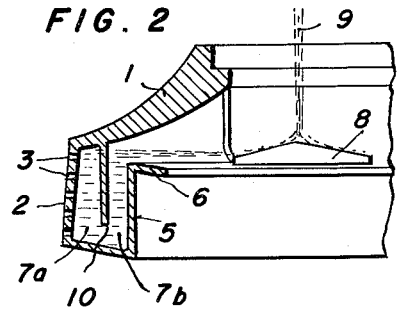
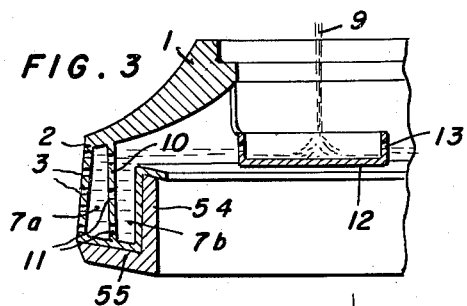
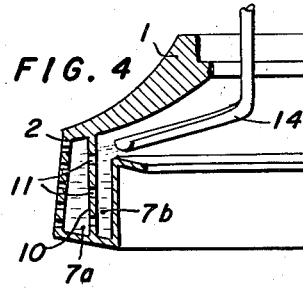
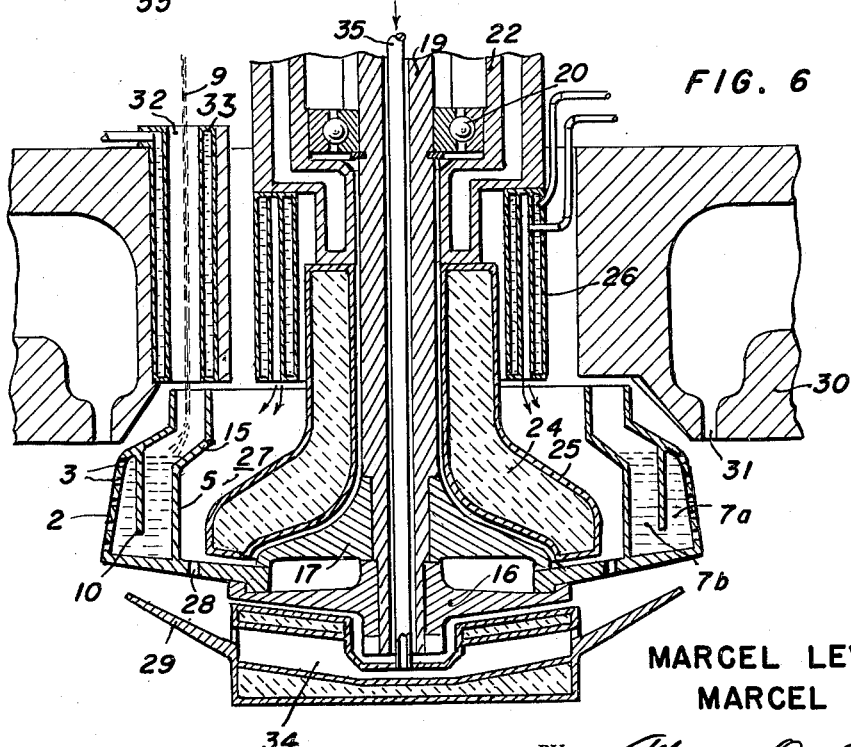
INVENTORS
MARCEL LEVECQUE
MARCEL MABRU
BY
ATTORNEY

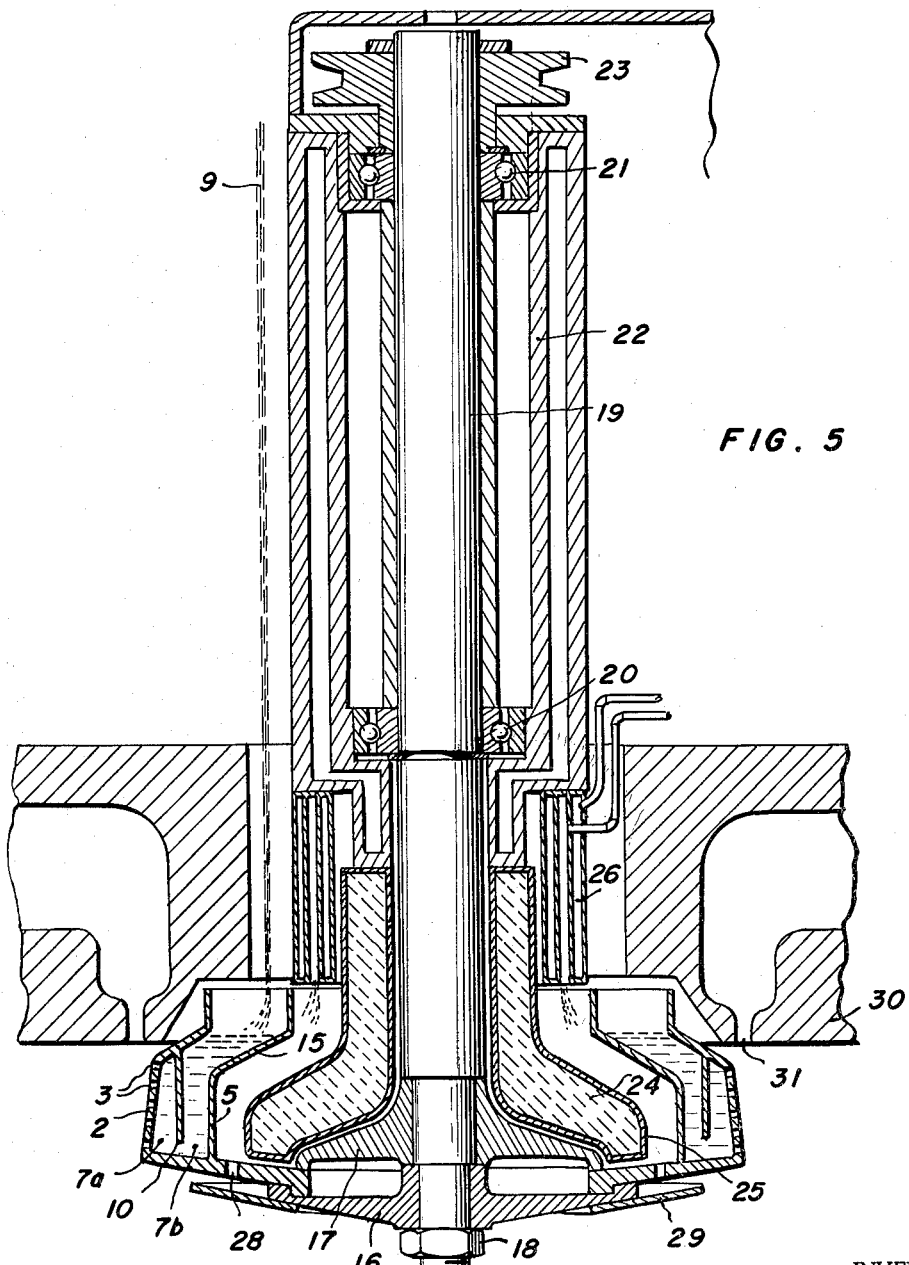

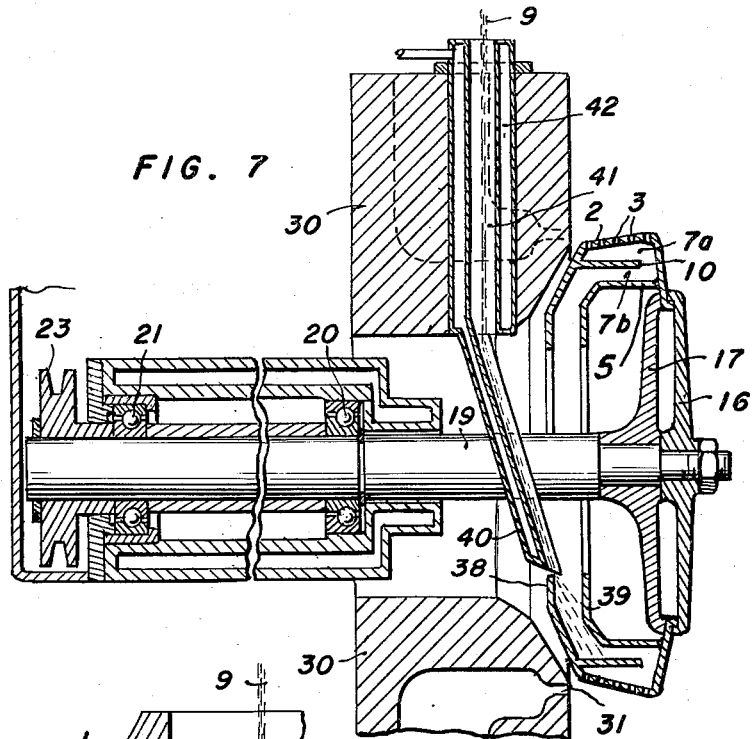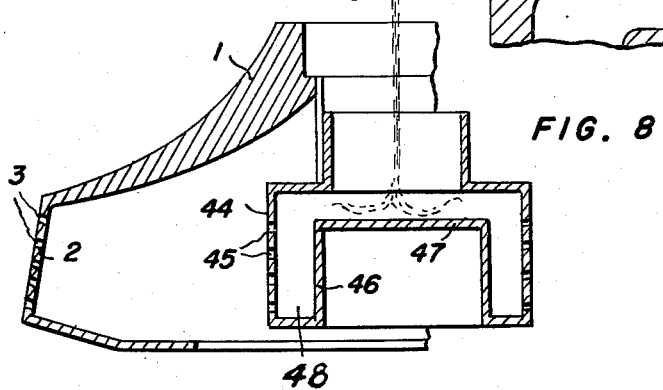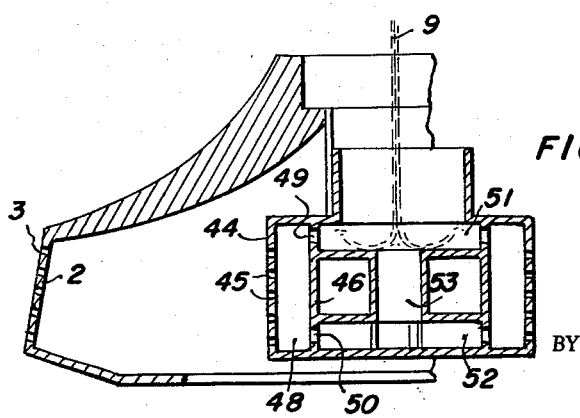

3,007,196
MANUFACTURE OF FIBERS OF THERMOPLASTIC MATERIALS SUCH AS GLASS
Marcel Levecque, Saint-Gratien, and Marcel Mabru, Paris, France, assignors to Societe Anonyme des Manufactures des Glaces & Produits Chimiques de Saint-Gobain, Chauny & Cirey, Paris, France, a corporation of France
Filed May 7, 1958, Ser. No. 733,593
Claims priority, application France May 9, 1957
11 Claims. (Cl. 18—2.6)

The present invention relates to the manufacture of fibers from thermoplastic materials in the viscous state, and in particular fibers of glass.

It is known in the art for the production of such fibers to utilize a hollow body into which the melted material is supplied, and the periphery of which is provided with orifices distributed in one or several rows. This hollow body is rotatably driven at high speed about its axis and the molten material is projected by centrifugal force through the orifices of the peripheral band or wall in the form of threads, which then undergo a stretching effect which transforms them into fibers.

It is likewise known to provide, at the interior and co-axially with the rotating body or centrifuge, an organ built in the shape of a cup with its lateral wall provided with orifices, into which cup the molten material is led, this organ serving to project said material on the internal surface of the peripheral band of the rotating body and to distribute it in regular fashion over the whole height.

The invention consists in attaining opposite the whole height of the peripheral band or side wall of the distributing organ, a reserve of material entirely filling a space defined by said band or wall and an interior co-axial wall. A constant and identical pressure is thus obtained over all the projection orifices functioning in that band or wall, resulting in a great regularity of the characteristics of the fibers produced thereby.

According to one method of realization of the invention, an annular space of practically constant section is provided opposite the projection orifices of the peripheral band of the centrifuge or of the side wall of the distributor.

The melted material may be introduced to the inside of this annular zone by simple gravity. It may also be projected into it, for example, by the action of centrifugal force, by making a thin supply stream of the melted material flow onto a rotary distributor of suitable shape.

The introduction of the material into the annular zone may be effected solely through the upper part or only through the lower part of this annular zone, or again through intermediate parts.

The invention also contemplates placing a coaxial partition at the inside of the space filled with reserve material, thereby forming a baffle for the passage of the material, which serves to equalize the temperature of the material over the entire height of the peripheral band or of the side wall of the distributing organ.

Other characteristics and advantages of the invention will be developed by the description which follows, and which relates to different forms of realization of the invention which are presented as examples and not by way of limitation, in conjunction with the accompanying drawings, wherein:

FIG. 1 is a sectional view of the bottom portion of a centrifuge in accordance with the invention;

FIG. 2 is a sectional view of a second embodiment of the invention which incorporates a partition in the reserve supply chamber;

FIG. 3 illustrates a third embodiment of the invention presenting a different form of partition in the reserve supply chamber, as well as a modified form of distributor;

FIG. 4 is a vertical sectional view of centrifuge of reduced diameter in which the supply of thermoplastic material is led to the reserve supply chamber by means of a fixed trough;

FIG. 5 is a vertical sectional view of still another embodiment of the invention showing the reserve supply of thermoplastic material heated over all of its surfaces;

FIG. 6 is a vertical sectional view of a variation of the apparatus shown in FIG. 5, incorporating in addition a combustion chamber for hot gases at the lowermost end of the apparatus;

FIG. 7 is a vertical sectional view of a centrifuge arrangement in accordance with the invention mounted on a horizontal axis;

FIG. 8 is a vertical sectional view of a modified arrangement wherein the feature of providing a uniform supply of reserve material is applied to the inner distributing member which supplies the molten thermoplastic material to the inner face of the peripheral wall of the centrifuge; and FIG. 9 is a vertical sectional view of a modified arrangement of that shown in FIG. 8.

Although in the course of this description, the production of glass fibers is set forth, it is, of course, understood that the invention applies in a general way to the production of fibers from thermoplastic materials.

In the embodiment shown in FIG. 1, the hollow rotating body or centrifuge 1 is provided with peripheral band or wall 2 with a plurality of superposed rows of projection orifices 3, which may run as high as twenty to twenty-five rows. The body 1 also has an annular bottom 4 and an interior wall 5 with an inwardly turned edge 6. Thus, chamber 7, defined by walls 2, 4 and 5, is concentric to the axis of the hollow body. Additionally, a distributing plate 8 is integrally connected with the hollow body 1 and is arranged co-axially therewith, to permit a molten glass supply stream 9 to be fed thereon and to be deflected therefrom by centrifugal force for the purpose of feeding the machine.

By the action of centrifugal force, the molten glass is projected from the plate or distributor 8 into chamber 7 through the passage left free above edge 6, to entirely fill this chamber. Thus, a reserve of glass is formed, assuring a constant and identical pressure over all the projection orifices, and all the projected glass threads are identical whatever the level of the row of orifices which produces them.

According to a variation, the filling of chamber 7 may be effected through its lower part, which may contain an opening for the introduction of glass projected from plate 8, the latter being appropriately shifted toward the bottom.

In the embodiment of the invention illustrated in FIG. 2, the chamber with the reserve supply of molten glass has an interior partition 10 concentric to the axis of the rotating body or centrifuge 1. This partition is integral with the upper part of the rotating body, leaving a free space or passage adjacent to the bottom 4, in such a way that the two parts 7a—7b of the chamber are connected by this passage. This arrangement presents the advantage of attaining an equalization of the temperature of the glass along the entire height of the peripheral band or wall, the partition 10 being in fact heated more at its upper part, by the glass entering above rim 6, in the zone opposite the peripheral band which tends to be colder.

In the variation represented by FIG. 3, the interior partition 10 extends over the entire height and it is pierced with a certain number of holes 11 at different levels which permit communication between parts 7a and 7b of the chamber.

In lieu of using a plate for the introduction of the glass into the chamber, one may utilize a receiver 12, integral with the hollow body and open at the top to receive the molten glass supply stream 9. Orifices 13 are provided on the periphery of this receiver, through which the glass is projected for its introduction into the opening of the part 7b of the chamber.

As shown in this figure, linings 54—55 may be provided adjacent to the inner and bottom walls to avoid heat losses and to equalize the temperatures.

In the embodiments described above, the molten glass is introduced into the chamber, forming a reserve of glass through the action of centrifugal force. It can also be introduced into said chamber by gravity. FIG. 4 shows such an arrangement, the melted glass being conducted to the upper part of the chamber 7b by way of a fixed trough 14.

It will be noted that in an arrangement such as the foregoing, the entry of the glass is offset or displaced with respect to the axis of the rotating body. Such an arrangement can be advantageous with respect to those according to which the glass thread is conducted along the axis, through passage into a channel provided axially in the shaft serving to drive the turning body. It allows in fact a considerable diminution of the diameter of this shaft, and consequently the utilization of rollers of smaller diameter. This is obvious from a comparison of the radius of the central opening of the body 1 with respect to that of the openings in the bodies shown in FIGS. 1 to 3.

FIG. 5 shows a device for the production of fibers having a reserve supply of glass according to the invention, as well as the introduction of the glass supply stream displaced with respect to the axis of rotation of the rotating body. Conformably with the invention, this device is also arranged so as to heat the reserve supply of glass over practically all its surfaces.

This device has a rotating body with chambers 7a—7b and intermediate partition 10 under which the glass passes from part 7b to part 7a. This arrangement is similar to that shown in FIG. 2. It also has a wall 15 extending upwardly from the inner lateral wall 5 to form an annular trough. The glass supply stream 9 falls by gravity into this trough and, from there, passes into part 7b.

The rotatable body is held between two plates 16—17 by means of threaded nut 18 screwed onto the end of the driving shaft 19 which is solid and which may be of small diameter. This spindle shaft is rotatably mounted in ball bearings 20—21, which may also be of small diameter, and which are mounted in a fixed column 22. The rotation of shaft 19 is obtained by means of a pulley 23.

Under column 22 is fixed a screen which, for example, may be made of a heat-insulating material 24 which is resistant to high temperature and which in turn may be surrounded by a metallic envelope 25.

The chamber containing the reserve of molten glass is heated through its interior wall 5 by means of hot gases leaving the water-cooled burner orifices 26 provided under column 22, these hot gases passing into space 27 between said interior wall and the heat-insulating screen 24—25 and evacuated through orifices 28 provided on the bottom of the rotating body. These gases are then deflected by a screen 29 integral with plate 16, and in their course lap the peripheral zone of the bottom wall of the centrifuge body.

Peripheral band 2 of the centrifuge is inself heated on the outside by gases escaping from the annular slot 31 of a combustion chamber 30 concentric with the rotating body.

Heating of the chamber containing the reserve supply of molten glass, over all of its surfaces, in a manner which can be regulated, allows the glass in reserve to be kept at optimum temperature for the production of glass threads.

FIG. 6 shows a variation of such an apparatus as shown in FIG. 5. In this variation, the heating of the bottom of the chamber by gases escaping from orifices 28 is joined with heating produced by gases escaping from combustion chamber 34. This combustion chamber is mounted at the end of a fixed tube 35 passing into a conduit provided along the axis of shaft 19.

As shown, the molten glass supply stream 9 can cross the main block of the combustion chamber 30 through a channel 32, which may be cooled by means of the circulation of fluid in surrounding jacket 33.

The invention also provides a device for producing fibers in which the rotating body is actuated by a rotary movement around a horizontal axis, the glass being conducted by gravity into the reserve chamber. Such an embodiment is illustrated in FIG. 7.

Shaft 19 is horizontal and is pivotally mounted in ball or roller bearings 20—21 mounted at spaced points of bearing block 22. A hollow rotatable body is mounted on one end of shaft 19 and includes a chamber for the reserve supply of glass, which chamber is mounted by means of plates 16 and 17, and is divided into two parts 7a—7b by a partition 10 as in the preceding examples. Substantially vertical walls 38 and 39 are extended from the peripheral band 2 and the interior wall 5 to form an annular passage for conveying the molten glass. The latter enters the passage by gravity through a water-cooled trough 40.

This device can be completed by heating devices such as those described above. In FIG. 7 is shown only one combustion chamber 30 with annular slot 31. The supply stream of glass crosses the main body or block of this combustion chamber through a channel 41 which may be cooled by a jacket 42, through which cooling liquid is passed.

The foregoing examples refer to the application of the invention to a hollow rotatable body in order to create a reserve of glass in a chamber between the internal surface of the peripheral band and a coaxial interior wall.

The following examples refer to the application of the invention to an organ designed to assure regular or uniform distribution of the glass over the entire internal surface of the peripheral band of the rotatable body.

Conforming to the invention, and according to the embodiment illustrated in FIG. 8, the distributing organ in the shape of a trough is placed along the axis of the rotatable body 1 and is integrally connected therewith. The glass supply stream 9 is fed to the distributor and a reserve of glass completely fills space 48 between the internal surface of the side wall 44 and the coaxial wall 46. The supply stream of glass strikes the horizontal wall 47 of the distributor and thereafter fills the space 48, wherefrom it is projected by centrifugal force through the superposed rows of projection orifices 45 against the lateral wall 2 of the rotatable body in a uniform and regular thickness over the entire height of the latter.

In the variation shown in FIG. 9, the feeding of chamber 48 forming the reserve of glass takes place through the top and bottom of said chamber through openings 49—50 provided in wall 46 extending over the entire height of the trough. These openings 49 and 50 allow respectively communication with upper spaces 51 and lower spaces 52, themselves connected by axial channel 53, the whole being supplied with glass by the supply stream 9.

We claim:

1. An apparatus for the manufacture of fine fibers from heated viscous thermoplastic material comprising a rotary centrifuge having a peripheral wall of substantial depth provided with a plurality of circular rows of orifices for the discharge of viscous material from the interior of said centrifuge upon the rotation thereof at high speed, a circular wall coaxial with said peripheral wall spaced a small distance inwardly therefrom to form an annular storage chamber therewith adjacent to the inner face of said peripheral wall, and means for feeding a constant supply of viscous material to fill said annular storage chamber to maintain a reserve supply of said material of substantially uniform cross-section adjacent to said inner face of said peripheral wall, said storage chamber confining a continuous stream of the material at optimum pressure and temperature.

2. An apparatus as set forth in claim 1 including a partition between said peripheral wall and circular wall to divide said annular storage chamber into two parts with at least one intercommunicating passage therein between the parts.

3. An apparatus as set forth in claim 1 including a distributing member fixed to said centrifuge for projecting by centrifugal force a uniform supply of said material into said storage chamber.

4. An apparatus for the manufacture of fine fibers from heated viscous thermoplastic material comprising a rotary centrifuge having a peripheral wall of substantial depth provided with a plurality of circular rows of orifices for the discharge of viscous material from the interior of said centrifuge upon the rotation thereof at high speed, a circular wall coaxial with said peripheral wall spaced a small distance inwardly therefrom to form an annular storage chamber therewith adjacent to the inner face of said peripheral wall, and means for feeding by gravity a constant supply of viscous material to fill said annular storage chamber to maintain a reserve supply of said material of substantially uniform cross-section adjacent to said inner face of said peripheral wall, said storage chamber confining a continuous stream of the material at optimum pressure and temperature.

5. An apparatus as set forth in claim 4 wherein said means comprises a material supply stream displaced from the rotary axis of said centrifuge whereby the mounting shaft therefor may be of reduced diameter.

6. An apparatus as set forth in claim 4, including heating means for said storage chamber over substantially all the walls thereof.

7. An apparatus as set forth in claim 4, wherein said heating means includes hot combustion gases or flames directed across the internal annular wall of said storage chamber as well as across the external peripheral wall of said centrifuge.

8. An apparatus as set forth in claim 4, wherein said rotary centrifuge is mounted on a horizontal axis for rapid rotation.

9. An apparatus for the manufacture of fine fibers from heated viscous thermoplastic material comprising a rotary centrifuge having a peripheral wall of substantial depth provided with a plurality of circular rows of orifices for the discharge of viscous material from the interior of said centrifuge upon the rotation thereof at high speed, a column for mounting said centrifuge for rotary movement, means for feeding by gravity a constant supply of viscous material to the inner face of said peripheral wall comprising an annular storage chamber for a reserve supply of said material of substantially uniform cross-section adjacent to said inner face of said peripheral wall, heating means for said storage chamber over substantially all the walls thereof comprising an annular combustion chamber on the bottom of said column adjacent to said storage chamber for directing hot combustion gases or flames across the internal annular wall of said storage chamber, and a second annular combustion chamber having an annular slot therein beyond the external peripheral wall for supplying the hot combustion gases or flames adapted to be directed across said last-mentioned wall, whereby said storage chamber confines a continuous stream of heated material at optimum pressure and temperature.

10. An apparatus as set forth in claim 9 wherein a deflector plate is provided at the end of the centrifuge for directing the hot gases or flames issuing from said first combustion chamber across the bottom wall of said storage chamber.

11. An apparatus as set forth in claim 9 including a third combustion chamber at the end of the centrifuge adapted to be supplied with combustion gases through a conduit extending centrally through the column carrying the centrifuge for directing hot gases or flames across the bottom wall of said storage chamber.

References Cited in the file of this patent

UNITED STATES PATENTS

| | | |
|---|---|---|
| 1,352,623 | Perry | Sept. 14, 1920 |
| 2,217,235 | Rieser | Oct. 8, 1940 |
| 2,333,218 | Von Pazsiczky | Nov. 2, 1943 |
| 2,624,912 | Heymes et al. | Jan. 13, 1953 |
| 2,793,395 | Richardson | May 28, 1957 |

FOREIGN PATENTS

| | | |
|---|---|---|
| 205,437 | Australia | Aug. 30, 1956 |